(12) United States Patent
Van Tuyl

(10) Patent No.: X6771
(45) Date of Patent: Sep. 28, 1831

(54) WIND WHEEL, HORIZONTAL

(76) Inventor: John Y. Van Tuyl

John Y. Van Tuyl
Letters Patent

The Schedule referred to in these Letters Patent, and
making part of the same; containing a description in
the words of the said John Y. Van Tuyl himself, of
his Improvement in the application of the Power of Wind
to Mills. Factories. Boats or vessels. Pumps and all kinds
of Machinery.

To all to whom these presents shall come:
Be it known that I, John Y. Van Tuyl of Rahway in
the County of Essex and State of New Jersey, have in-
vented a new and useful improvement in the application
of the power of Wind, Applicable to Mills, Factories, Boats or
vessels, Pumps and all kinds of Machinery requiring power, and
that the following is a full and exact description of the con-
struction and operation of the said improvement as invented by
me (a drawing of which is annexed) viz.
In the centre is an upright shaft running on a point in
the ordinary manner. The wheel is made as common water
wheels with the Buckets outside of the rims, and of course runs
horizontally. The red line is intended to represent an open
space just wide enough for the buckets to clear the ends of the
funnel boards. The funnels are represented by the angular
lines drawn around the wheel, and are made perma-
nently fast on a circular floor of sufficient width for the length
of the funnel. The buckets or propelling boards are secured to
the wheel at right angles with the wheel, of any required
length outside the rims, on which the wind acts, being driven
thro' the funnels and discharged on the buckets at the throat of
the funnels where it is compressed and acquires a greatly in-
creased force. The rim of the wheel must be as broad as the
buckets are long, and made tight to prevent the wind escap-
ing ing into the wheel. The buckets are straight pieces of boards set with a small inclination to receive the wind direct from the throat of the funnels. The funnels must be as deep perpendicularly at the throat as the length of the buckets and all placed on the same angle from the rim of the wheel, and covered with a cover corresponding with the floor. The size of the mouths of the funnels will be in proportion to the length of the funnels, which can be regulated according to the work or resistance required to be overcome and the power can be increased to any desired extent. Doors must be hung at the mouth of every funnel, for the purpose of closing as many of the funnels as may be necessary, when the wind is too strong to open back against a cleat at top and bottom, and can be opened or shut by a cord or chain leading through pulleys or blocks into the Mill &c, and the motion of the wheel thereby regulated at pleasure, in connexion with a Governor & friction bands. The Invention I claim is the improved manner above described for applying the power of wind to Mills &c — which I believe to be original.

Witnesses
Amos Morse
W. H. Cleaver

John Y. Van Zuyl

E.P.
N.G.C.

440 words (Rec.d June 5. 1837 & Recorded anew)

United States Patent
Patent No.: X6771
J. Y. Van Tuyl,
Wind Wheel.
Patented Sep. 28, 1831.
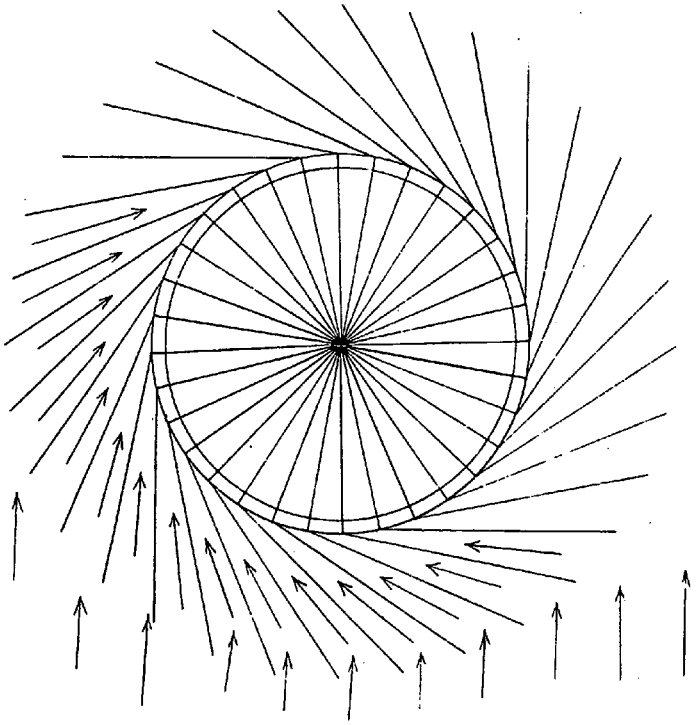
R. PETERS PHOTO-LITHOGRAPHER WASHINGTON D.C.